United States Patent [19]

Horiba et al.

[11] Patent Number: 4,558,462
[45] Date of Patent: Dec. 10, 1985

[54] APPARATUS FOR CORRECTING IMAGE DISTORTIONS AUTOMATICALLY BY INTER-IMAGE PROCESSING

[75] Inventors: Isao Horiba, Kariya; Akira Iwata, Nagoya, both of Japan

[73] Assignee: Hitachi Medical Corporation, Japan

[21] Appl. No.: 528,249

[22] Filed: Aug. 31, 1983

[30] Foreign Application Priority Data

Sep. 2, 1982 [JP] Japan .................................. 57-151802

[51] Int. Cl.⁴ .............................................. G06K 9/36
[52] U.S. Cl. ....................................... 382/42; 382/43
[58] Field of Search ..................... 382/42, 43; 364/728, 364/726, 724

[56] References Cited

U.S. PATENT DOCUMENTS 3,905,045 9/1975 Nickel .................................. 250/558
4,049,958 9/1977 Hartmann ........................... 364/728
4,084,255 4/1978 Casasent et al. ....................... 382/43

Primary Examiner—Leo H. Boudreau
Assistant Examiner—Jacqueline Todd
Attorney, Agent, or Firm—Murray, Whisenhunt and Ferguson

[57] ABSTRACT

An apparatus for automatically correcting image distortions by inter-image processing, which is arranged to obtain, prior to performing the inter-image processing of two two-dimensional digital images, a displacement vector between these two images, and to thereby obtain, based on this displacement vector, a corrected image of one of these two images, and to provide this corrected image for performing the inter-image processing between it and the other image.

9 Claims, 11 Drawing Figures

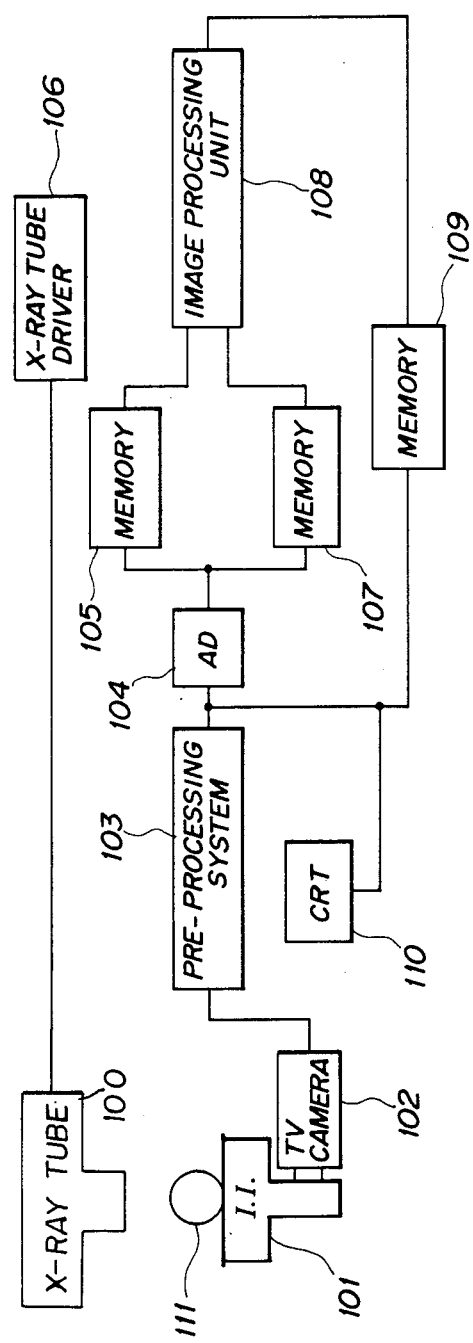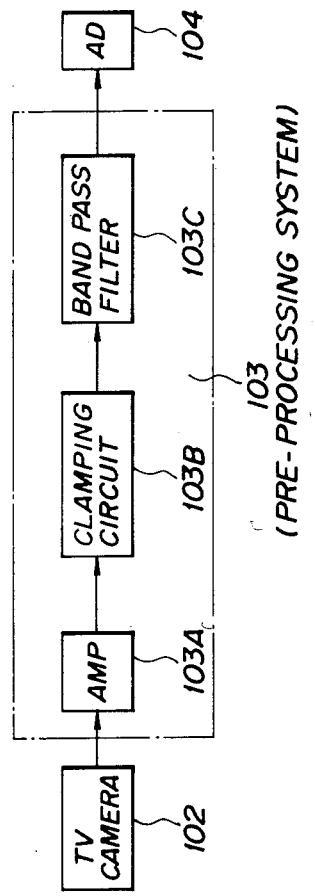
FIG.1
FIG.2

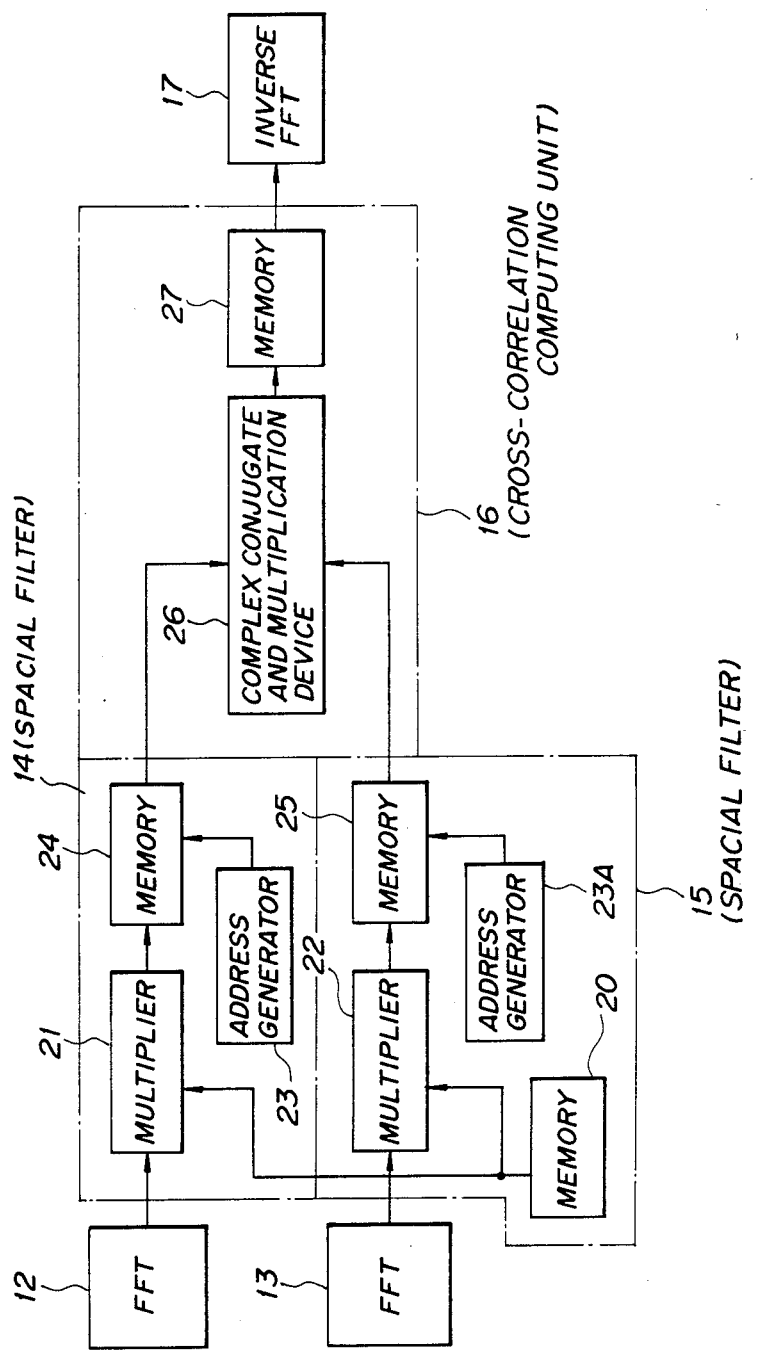

APPARATUS FOR CORRECTING IMAGE DISTORTIONS AUTOMATICALLY BY INTER-IMAGE PROCESSING

BACKGROUND OF THE INVENTION

1. Field of the Invention

The present invention relates to an apparatus for correcting image distortions automatically by inter-image processing.

2. Description of the Prior Art

In the medical field, for example, a functional image of a certain physical region of the patient under examination is taken to make a diagnosis. The functional image is taken by measuring a same vital region of the patient at two different moments which indicate the correlation between the image of the two moments. The correlation is obtained by first taking the difference between the two images, and doing certain processing after that.

However, in case of a moving physical organ, the movement of the organ causes undesirable effects upon the desired functional information to impair the reliability of the real functional image.

SUMMARY OF THE INVENTION

It is, therefore, the object of the present invention to provide an apparatus for correcting image distortions automatically by inter-image processing, the apparatus eliminating adverse effects upon the functional image caused by the unwanted movement of the vital region of the patient under examination.

The present invention features the utilization of automatic correction of distortions between two images which is performed by taking the partial cross-correlation between them and then eliminating the relative partial distortions of the image.

BRIEF DESCRIPTION OF THE DRAWINGS

FIG. 1 is a block diagram of the entire system of the apparatus of the present invention.

FIG. 2 is a block diagram showing the arrangement of the pre-processing unit of the apparatus.

FIG. 7 is a block diagram showing an example of the actual spatial filtering.

DETAILED DESCRIPTION OF THE PREFERRED EMBODIMENT

Figure 3:
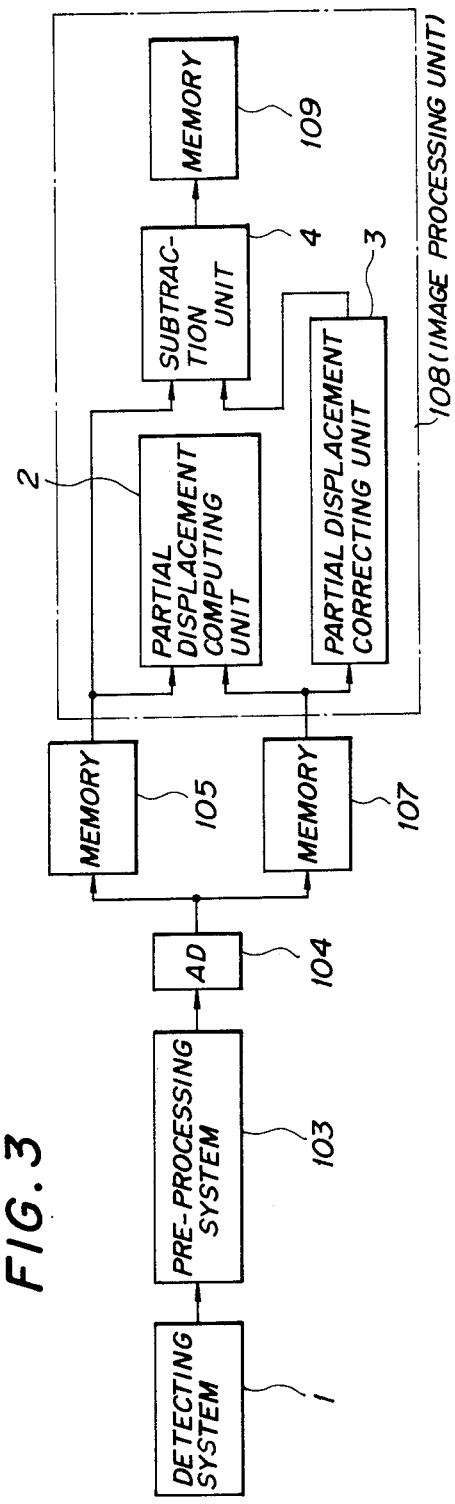
FIG. 3 is a block diagram showing the details of the image processing unit and the connection between the image processing unit and its peripheral circuits.

FIG. 1 shows the entire system of an embodiment wherein the present invention is applied to a digital subtraction angiography. An X-ray tube 100 generates an X-ray based on the command of an X-ray tube driver 106. The X-ray irradiating from the X-ray tube 100 impinges upon the physical body 111 of a patient under examination. The X-ray which has transmitted through the patient's body is converted to a photo-signal by an image intensifier 101. A TV camera 102 receives the light of the image intensifier to perform a photography. This photography is carried out throughout the region of measurement of the patient, to ultimately obtain a photographed image indicative of the entire region of measurement of the particular region of the patient's body.

The TV camera 102 successively reads out, in what is called the raster scanning system, its photographed image in the form of video signals, and feeds them to a pre-processing unit 103. This pre-processing unit performs an amplification of the video signals and carries out DC level clamping of the amplified video signals and also performs filtering to take out only the required frequency band of the signals. The arrangement of the pre-processing unit is shown in FIG. 2. An amplifier 103A performs an amplification of the video signals. A clamping circuit 103B performs the DC clamping of the amplified video signals. This DC clamping is performed to reduce significant differences in the brightness of the video signals. A band pass filter 103C transfers only the video signal band in order to improve the SN ratio of the signal by removing mainly surplus high frequency signal components.

An A-D converter 104 at the output of the filter in the pre-processing unit performs an A-D conversion.

A memory 105 takes-in the digital output of the A-D converter 104 and stores a first photographed image. A memory 107 takes-in the digital output of the A-D converter and stores a second photographed image. These first and second photographed images constitute images for use in digital subtraction angiography (digital fluoroscopy).

The term digital subtraction angiography means the below-mentioned photography. A measurement of the region for study is taken to obtain a first measurement image. Then, a medical drug which enhances the absorption of X-ray, i.e. a contrast medium is injected into the vein of the patient. After this medium has imparted an image-enhancing effect upon the measurement image, i.e. at a timing different from the timing at which the first measurement image was obtained, another measurement of the same region of the patient body as the abovementioned measurement region is performed to obtain a second measurement image. Next, a subtraction between the first and second measurement images is taken. This subtraction image may be used to evaluate the physical function of the region of the organ in question and, in particular, the blood current of the measurement region. The technique of computing such a blood current image to make a diagnosis of the measurement region of the patient's body under study is called digital subtraction angiography.

It is the general practice that the first and second measurement images are stored in respective memories. The above said memory 105 stores the first measurement image, and the memory 107 stores the second measurement image, in this embodiment. Furthermore, in digital subtraction angiography, the first measurement image which is stored in the memory 105, i.e. the image prior to administration of the the contrast medium, is called a mask image, whereas the second image which is stored in the memory 107 is called a live image.

An image processing unit 108 takes in the first measurement image stored in the memory 105 and also the second measurement image of the memory 107, and carries out a computation of the difference therebetween. This difference indicates the amount of variation occurring in the measurement region. This computation is a fundamental operation in digital subtraction angiography and is well known. In the present invention, however, the image processing unit 108 has, in addition to the well-known differentiating function, a partial displacement computing function and also a partial displacement correcting function.

The image processing may be performed in a real spatial domain, but it may be likewise done in a frequency domain. In the embodiment of the present invention, the partial displacement computing function is understood to be performed in the frequency domain. However, the differentiating function and the partial displacement correcting function are performed in the real spatial domain.

Description will hereunder be made of partial displacement. In case of a physical organ wherein the region under measurement is moving, an information of such a movement naturally is superimposed on the information of the physical function in question (subtractional information), and no precise and correct real functional image can be obtained. If the information concerning the movement can be removed, it is possible to obtain the real functional image. Therefore, in order to eliminate the movement information, the concept of partial displacement is introduced. This partial displacement points to such factors as will indicate those informations of movement noted between the two measurement images which constitute the ground for the computation of the difference. This partial displacement is computed based on the first and second measurement images, and then, based on the amount of partial displacement which is the result of said computation, the second measurement image is corrected, to thereby eliminate the movement information. Thereafter, a difference between the first measurement image and the corrected second measurement image is taken. The differential information thus obtained will serve as the real functional image which is to be sought.

A memory 109 stores the functional image of the image processing unit 108. A CRT 110 exhibits the functional image of the memory 109. This exhibited image constitutes the real functional image to serve as the information for making a diagnosis.

FIG. 3 shows the detailed arrangement including the image processing unit 108. The detecting system 1 is constructed with the image intensifier 101 and the TV camera 102 shown in FIG. 1. The detection of X-ray may be made by an image intensifier, but also by a xenon detector or by a commonly used combination of an X-ray film and its readout unit. The pre-processing system 103 is comprised of such an arrangement as that shown in FIG. 2. The image processing unit 108 is comprised of a partial displacement computing unit 2, a partial displacement correcting unit 3 and a differential computing unit 4. The partial displacement computing unit 2 takes-in the first measurement image and the second measurement image which are stored in the memories 105 and 107, respectively, and performs the computation of the partial displacement between these two images. The computation of the images is performed in such a way that the first and second measurement images are both segmented into small segments, and mutual correlation computations between the corresponding segments are carried out, and thus a displacement vector indicative of displacement per segment is computed.

The partial displacement correcting unit 3, based on the displacement vector computed in the partial displacement computing unit 2, performs a partial displacement correction of the second measurement image.

The subtraction unit 4 takes the difference between the first measurement image of the memory 105 and the second measurement image which has been corrected of its partial displacement. The output of this difference will serve as the functional image having no distortions.

Figure 4:
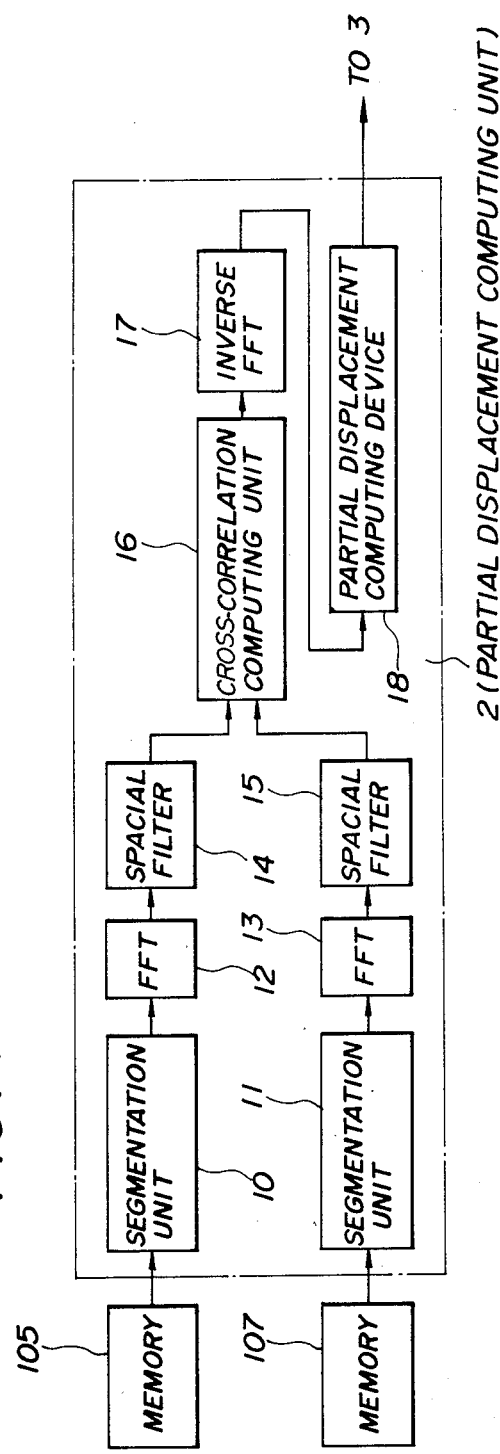
FIG. 4 is a block diagram showing an example of the partial displacement computing unit.

An example of the partial displacement computing unit 2 is shown in FIG. 4. The computing unit 2 is comprised of:
(i) segmentation units 10 and 11 comprised of sample windows;
(ii) FFT computing units 12 and 13 for performing Fourier transformation of the outputs of the segmentation unit;
(iii) filtration units (spatial filters) 14 and 15 for filtering the output of the FFT computing unit in the complex frequency domain;
(iv) a cross correlation computing unit 16 in the frequency domain for performing cross correlation between the outputs of the spatial filtrations obtained for individual images of the memories 105 and 107, i.e. a complex conjugate multiplying unit;
(v) an inverse Fourier transformation unit for making an inverse Fourier transformation of the output of the complex conjugate computing unit; and
(vi) a partial displacement computing device 18 for computing the amount of the partial displacement using the output of the inverse Fourier transformation unit.

Figure 5:
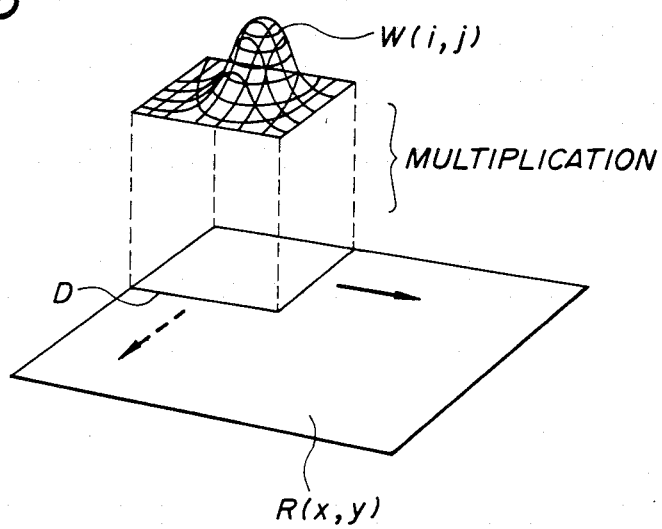
FIG. 5 is a diagram showing the relationship between segmentation and window function.

The processing done by the segmentation units 10 and 11 by virtue of the sample windows of (i) is shown in FIG. 5. The contents of the processing done by these processing units 10 and 11 are identical relative to each other. The only difference therebetween lies in whether the object of processing is the image of the memory 105 or that of the memory 107. Therefore, only the contents of processing done by the segmentation unit 10 will be described hereunder.

In FIG. 5, the original image represents the data stored in the memory 105. The original image can be expressed by two dimentional coordinates $R(x,y)$. The original image $R(x,y)$ is divided into individual image segments D of a size m ×n consisting of a vertical size m and a horizontal size n, i.e. meaning pixels m multiplied by pixels n. This segmentation into individual segments of image is performed in the order from the leftmost top horizontally toward rightmost top and from leftmost top downwardly toward leftmost bottom. The order of this segmentation follows the raster scanning system. Accordingly, it will be noted that, by the segmentation, a plurality of image segments D are obtained from an original single image.

Each segmental image has its central region and peripheral regions which are located in the vicinity of the boundaries of the segmental image. As noted, the peripheral regions are located close to the boundaries of the segment, and also independently handle each segmented image which is defined and distinguished from any adjacent segments by the boundaries. Thus, such regions have a high degree of discontinuity as a data. On the other hand, the central region of the segment is located remote from the boundaries of the segmental image, and thus it has a high degree of continuity as a data.

Accordingly, in order to eliminate the adverse effect due to the discontinuity in those peripheral regions of the segmental image located outside of the central region as a result of the segmentation of the original image, it is necessary to use such a processing that is intended to stress the central region and to reduce the close-boundary regions. Thus, a segmentation window function W(i,j) is set, and it is multiplied with the image segment D. The segmentation window function W(i,j) is a function intended to stress the central region and to reduce the close-boundary regions, as indicated in FIG. 5. The segmented image $Q_{pq}(i,j)$ obtained by the multiplication will become $$Q_{pq}(i,j) = W(i,j) \times R(i+mp, j+nq) \quad (1)$$

wherein p represents the image segment number as viewed horizontally, and q represents the image segment number as viewed vertically. By combining p and q, the segment image number is specified.

The segmentation window function W(i,j) requires a minimized side lobe for the reduction of error (truncation error) due to the effect of the image segmentation in the after-processing stage, and also requires that it is a limited function. Now, the segmentation window function W(i,j) is indicated by a polar coordinate as follows:

$$W(i,j) = G(r) \quad (2)$$

If the original point of the polar coordinate is set at the central position of each segmental image, r will become $$r = \sqrt{\left(i - \frac{m}{2}\right)^2 + \left(j - \frac{n}{2}\right)^2} . \quad (3)$$

Furthermore, G(r), when given with Blackman's function (maximum side lobe being −58 dB), will become:

$$G(r) = 0.42 - 0.5 \cos\left(\pi - \frac{2\pi r}{\min(m,n)}\right) + 0.08 \cos\left(\pi - \frac{4\pi r}{\min(m,n)}\right) . \quad (4)$$

In case it is given with a trigonometrical function, G(r) becomes:

$$G(r) = \cos\left(\frac{\pi r}{\min(m,n)}\right) , \quad (5)$$

wherein the maximum side lobe in this case is −23 dB. The definitions and the roles of the above said segmentation window function W, truncation error, side lobes, limited function and Blackman function are all well known. Their well-known literatures include, for example, (1) "Digital Signal Processing" by Miyagawa et al and compiled by the Electronics Communication Society, and (2) Blackman, R. B. and J. W. Tukey: "The Measurement of Power Spectra", N.Y. Dover, 1958.

The computation of the Formula (1) in the abovesaid segmentation processing unit 10 will become as stated below. In correspondence to the respective coordinates (i,j) of the segment of image, the segmentation window function is stored in a memory which is different from the memory 105. The window function of this memory and the data stored in the memory 105 corresponding to the segment are multiplied with each other for each coordinate. The result of this multiplication will become the result of the operation of Formula (1). The result of multiplication is temporarily stored in a buffer memory to be ready for use in the next processing.

The segmentation unit 11 performs a processing which is completely the same as the other processings excepting only that the object of processing is directed to the image of the memory 107. The segmentation window function W(i,j) may also be set to the same value of function.

The FFT computing units 12, 13 of (ii) take-in the outputs of the segmentation units 10, 11 respectively, and perform a FFT (Fast Fourier Transformation) computation. Whereby, their transformation into frequency region is performed. The spatial filters 14, 15 of (iii) perform the elimination of the effect of the segmentation window function as well as the stressing of the positional alignment elements (spatial frequency components in question) and also to removal of noises. Whereby, the sensitivity of the partial correlation in the next processing is improved.

The spatial filters 14, and 15 perform spatial filtration in the frequency domain and not in the real spatial domain. Spatial filtration in the frequency domain means the filtration performed in the frequency region.

The characteristics of the spatial filters 14 and 15 are shown in FIG. 6, and detailed examples centering around the spatial filters 14 and 15 are shown in FIG. 7.

Figure 6A:
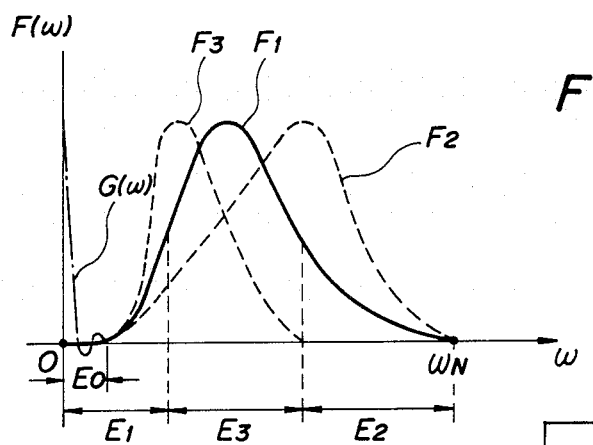
FIGS. 6A and 6B are diagrams to explain spatial filtering.

FIG. 6(A) shows a horizontal axis which represents a frequency ω and a vertical axis which represents a frequency spectrum F(ω). The unit of indication of the frequncy of the horizontal axis is set to LP/cm, wherein LP represents line pair. In FIG. 6(A), Nyquist frequency $ω_N$ indicated on the horizontal axis means, in this example, the maximum frequency which the pixel space which has been produced through segmentation can express.

FIG. 6(A) discloses the three unique characteristics $F_1$, $F_2$ and $F_3$ of the frequency spectra F(ω). In addition, the magnitude of the frequency ω is roughly divided into three regions, designating them as $E_1$, $E_2$ and $E_3$, respectively. The region $E_1$ is one for reducing the effect of the segmentation window. The region $E_2$ is one for removing noises. The region $E_3$ is one (for example, the region of 1.0–0.2LP/cm) for stressing the components of the spatial frequency of the domain in question. The characteristic G(ω) indicated by one-dot-chain line within the region $E_1$ represents a frequency spectrum due to the segmentation window function W. The characteristic of the spatial filter is set so as to minimize the frequency spectrum to a small value, to nil ideally.

The characteristic $F_1$ is the most widely adopted characteristic. In the region $E_1$, it is set so as to reduce the effect of the segmentation window. That is, in the region $E_0$ where the frequency spectrum of the segmentation window is not $G(\omega) \simeq 0$, the frequency spectrum of the characteristic $F_1$ is set at 0. For the characteristics $F_2$ and $F_3$ also, the region $E_0$ is provided with similar characteristics.

The characteristic $F_1$ has its peak in the region $E_3$, but in the region $E_2$, it has such a characteristic which descends so as to become 0 at Nyquist frequency. Accordingly, in case the spatial filter is provided with the charcteristic $F_1$, it is possible to achieve the elimination of the ill effect due to segmentation (region $E_1$), while in the region of the frequency of the space in question, this frequency can be stressed (region $E_3$), and with respect to noises of a high frequency, the noise level can be lowered, thus reducing the noises successfully (region $E_2$).

The characteristic $F_2$ features that its spectrum peak is shifted toward the right side as compared with the characteristic $F_1$, whereas the characteristic $F_3$ has the feature that its spectrum peak has displaced to the left side as compared with the characteristic $F_1$.

The characteristic $F_2$ has a larger frequency spectrum than $F_1$ in the region $E_2$. Accordingly, it is adopted as the characteristic of the spatial filter for such a waveform that is deemed to have reduced noise components at a high frequency.

The characteristic $F_3$, conversely to the characteristic $F_2$, is a characteristic which is suitable for such an instance wherein there are a number of noise components present at a high frequency.

The selection to adopt which one of the characteristics $F_1$, $F_2$ and $F_3$ depends on the nature of the waveform which is to be analyzed. Besides these characteristics, there are various other kinds of characteristics. In the current embodiment, the charateristics $F_1$, $F_2$ and $F_3$ are arranged so that their peaks are altogether identical. However, they may have different peaks, respectively. Also, the regions $E_1$, $E_2$ and $E_3$ may be set freely at will. The above-mentioned characters and effects of the spatial filters are well known, as referenced to such literatures as "Digital Filters" by R. W. Hamming, Bell Laboratories and Naval Postgraduate School, 1977, Prentice-Hall, Inc. This literature also contains the statement about the abovesaid window function.

Figure 6B:
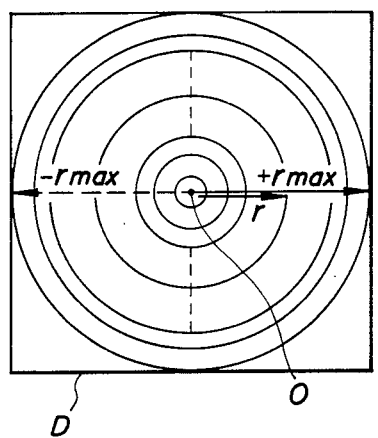

FIG. 6(B) shows the manner of application of the desired frequency characteristic of FIG. 6(A) to a two-dimensional image D. That is, the central point of FIG. 6(B) is assumed as zero frequency and the extreme right end ($+r_{max}$) as Nyquist frequency, and the distances from points on the respective two-dimentional coordinates to point 0 are to designate the frequencies r, thereby expressing the characteristics of FIG. 6(A), respectively. Here, point 0 means the position of zero frequency at which the frequency $\omega$ of FIG. 6(A) becomes: $\omega=0$, meaning the same point as the original point 0.

The above-mentioned spatial filtration is performed for each segmented unit. The spatial filtration is a computation which is a multiplication of the Fourier-transformed image for each segmental unit and the filter function. Here, the filter function which is to be multiplied represents only a real number (imaginary number part being zero) or the Fourier-transformed image is always expressed by a complex number. Accordingly, their multiplication will constitute the real number part of the image and imaginary part after Fourier transformation. The result of this multiplication is stored as a complex number in the memories 24 and 25.

Hereunder will be explained the arrangement and the actions of FIG. 7. The spatial filters 14 and 15 are each comprised of multipliers 21, 22; address generators 23, 23A; and memories 24, 25; and a memory 20. The memory 20 and the address generator 23 are provided in common for the spatial filters 14 and 15, respectively. The multiplier 21 performs the multiplication of the complex number of the output of the FFT computing unit 12 and of the complex number output of the memory 20. The multiplier 22 performs the multiplication of the output of the FFT computing unit 13 with the output of the memory 20. These two multiplications mean a multiplication of such a spatial frequency characteristic as shown in FIG. 6(A), in the complex frequency domain, to the frequency spectrum which is a result of the FFT computation, whereby a frequency spectrum reflecting this characteristic is obtained. The frequency spectrum reflecting the characteristic of FIG. 6(A) has the following various features that the segmented window frequency is reduced, i.e. the adverse effects of the segmentation window have been eliminated, and noise has been removed.

The memories 24 and 25 store the results of the multiplications done by the multipliers 21 and 22 based on the commands from the address generators 23 and 23A, respectively. This storing is conducted for each coordinate of each segment. On the other hand, at the time of the cross-correlation in the next stage, both the address generators 23 and 23A perform address designation, in the form of raster scanning, of the segment for both the memories 24 and 25. These memories 24 and 25 each has two memories for storing real components and imaginary components.

The cross-correlation computing unit 16 is composed of a computer 26 and a memory 27. The computer 26 performs a complex conjugate computation of either one of the data stored in the memory 24 and the data stored in the memory 25, and multiplies the result of this computation against the other data. Here, the complex conjugate computation means such a computation to make "a−bi" (wherein i represents an imaginary number) when the complex number is "a +bi".

The cross-correlation in the frequency domain means the computation of $F_1 \times F_2$ where the functions for taking cross correlation are assumed as $F_1$ and $F_2$, and this computation is well known. The aquisition of $F_2$ from $F_2$ represents a complex conjugate computation. Accordingly, to take a cross correlation in the frequency domain will thus mean the performance of a complex conjugate and complex multiplication computation.

The reason for taking a cross correlation of two functions is for the purpose of checking quantitatively how well these two functions resemble each other.

The result of computation of the cross correlation is stored in the memory 27. This cross correlation computation is performed for each segment.

The inverse Fourier transformation unit 17 conducts an inverse Fourier transformation of the result of the complex conjugate computation which, in turn, is a result of the cross correlation computation which has been stored in the memory 27. Whereby, the result of the cross correlation in the real domain is obtained. For example, let us here suppose that the number of the segments is m × n, wherein m and n represent the widths of the vertical side and the horizontal side of the segment, respectively. In general, m and n mean the number of pixels thus segmented. As an example, the widths of the segment may be m=8 and n=8; of m=16 and n=16; or m=32 and n=32. It will be noted that "m" may not be identical with "n". In case of a segment of m×n, their cross correlations are computed for each of their coordinates. For one segment, there is obtained the cross correlation of m×n in number. It will be noted that the computation of cross correlation is performed in the real spatial domain also, aside from in the Fourier domain.

Figure 8:
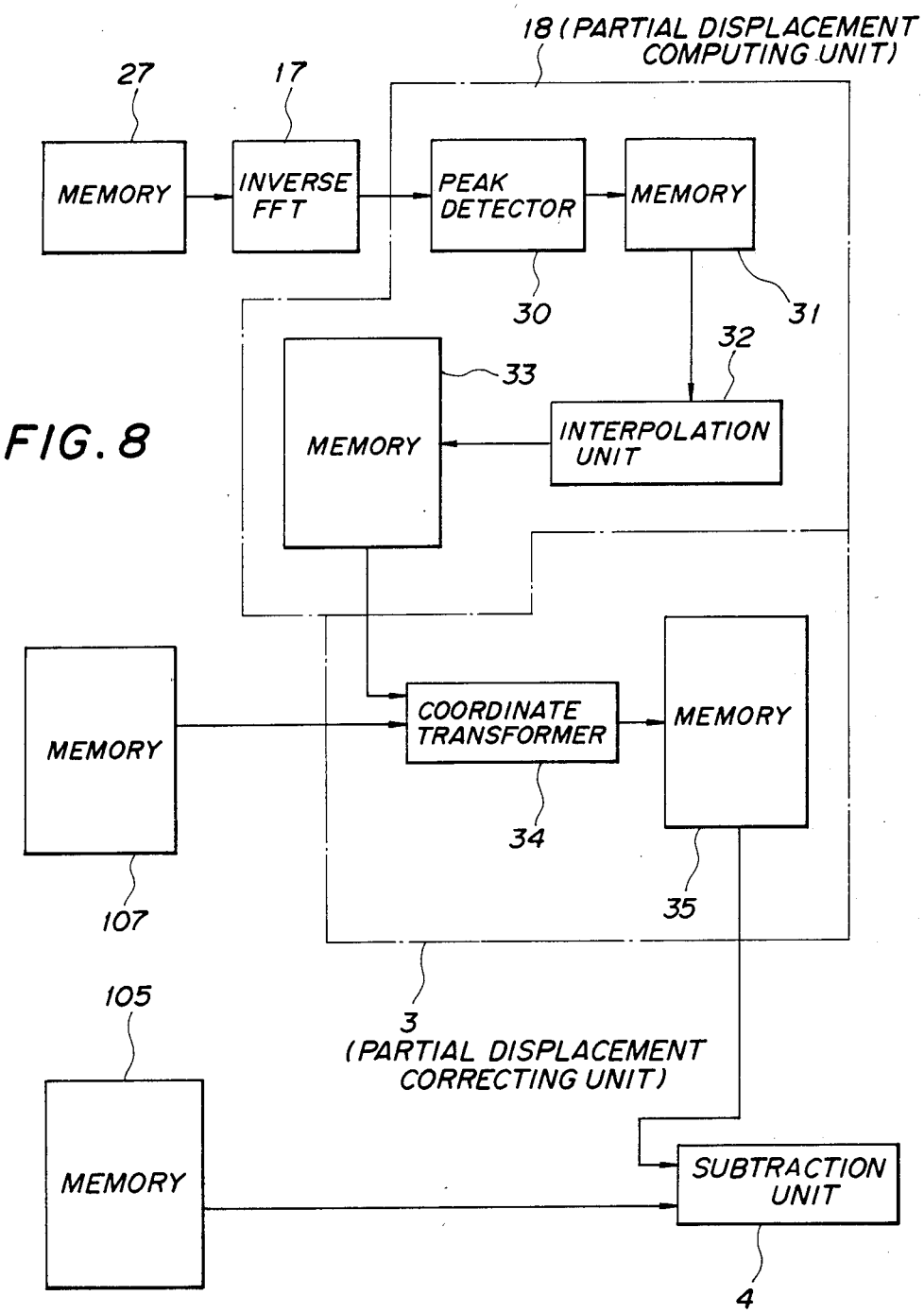
FIG. 8 is a block diagram showing an example of the actual partial displacement computing unit and partial displacement correcting unit.

Next, as shown in FIG. 4, the output of the inverse Fourier transforming unit 17 is taken in the partial displacement computing unit 18. The arrangement of this partial displacement computing unit 18 is shown in FIG. 8. The partial displacement computing unit 18 is comprised of a peak detecting unit 30, a memory 31, an interpolating unit 32 and a memory 33.

The peak detecting unit 30 detects the peak value (maximum value) out of the m×n cross correlation values which are obtained for each segment. If the number of segments is assumed to be M, there can be detected M peak values for a single image. The peak value in a single segment indicates that the functions for taking cross correlations in said segment resemble most. The coordinate on the two-dimensional coordinate which provides for this peak may be considered to indicate the direction of displacement. Accordingly, in the present invention, the coordinate on the two-dimensional coordinate when this peak is provided is defined as a displacement vector, and a displacement vector is taken for each segment.

The memory 31 stores the displacement vector which is detected by the peak detecting unit 30. The interpolation computing unit 32 takes, through interpolation, the respective displacement vectors of the entire pixels from the displacement vector for each sub-segment of a pixel. The respective displacement vectors of the entire pixels mean the displacement vectors for the respective pixels between the first and the second measurement images. The memory 33 stores the displacement vectors which have been obtained for the entire pixels.

Figure 9:
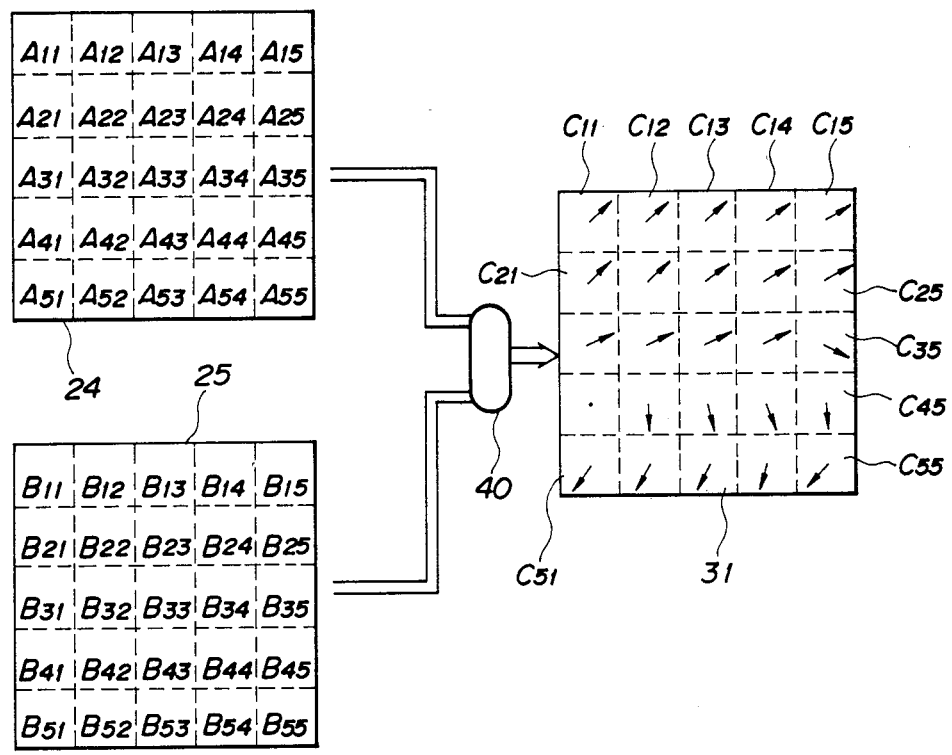
FIG. 9 is a diagram to explain the data after the spatial filtering and the segmental displacement vector.
Figure 10:
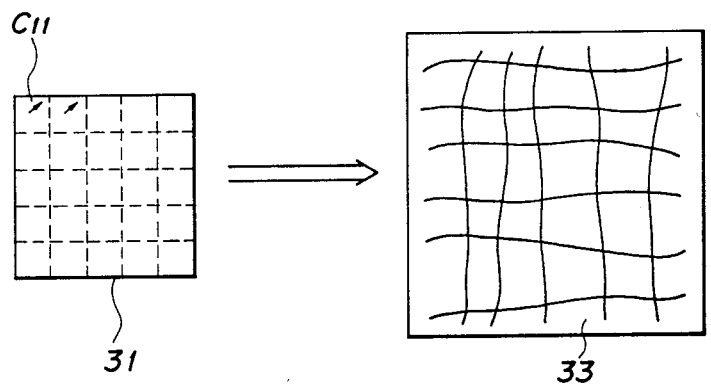
FIG. 10 is a diagram to explain the manner that a distorted coordinate is obtained from the segmental displacement vector through interpolation per pixel.

FIG. 9 is an explanatory illustration of the displacement vector for each segment. FIG. 10 is an explanatory illustration of the distorted coordinate.

In FIG. 9, the memory 24 stores the output of the spatial filter for the image A. The memory 25 stores the output of the spatial filter for the image B. Let us now suppose that both the images A and B have been segmented to provide segments of 5×5 in number. Furthermore, a single segment is supposed to be further segmented into 5 pixels ×5 pixels.

If the size of one segment obtained from the image A is composed of 5×5 pixels, then $A_{11} \sim A_{55}$ will indicate the output of the spatial filter for a divided single segment. Now, if the size of the segment taken from the image B is also composed of 5×5 pixels, then $B_{11} \sim B_{55}$ will indicate the output of the spatial filter for a single segment.

The processing unit 40 is the general term of the processing system leading from the complex conjugate and multiplication device 26 to the peak detecting unit 30. The memory 31 corresponds to the size of a single image, and it is comprised of 5×5 segments. The correlation between respective segments represents the cross correlation between the outputs $A_{11} \sim A_{55}$ and $B_{11} \sim B_{55}$ of the spatial filters. It is only necessary to take the cross correlation between $A_{11}$ and $B_{11}$, $A_{12}$ and $B_{12}$, ..., $A_{55}$ and $B_{55}$.

The result of the inter-segmental complex conjugate and multiplication is subjected to an inverse Fourier transformation, and they each take a cross correlation value. The cross correlation is taken for each pixel point which constitutes the pertinent single segment. Accordingly, if such a segment is the combination of pixels of 5×5 in number, there are obtained cross correlation values of 5×5 in number for a single segment. The maximum value among those cross correlation values of 5×5 in number will be the peak value for this particular segment.

The coordinate in the two-dimensional image when the peak value for each segment is provided will constitute a displacement vector, which is stored in the memory 31. $C_{11} \sim C_{55}$ represent displacement vectors for the respective segments. This displacement vector indicates the central coordinate as the original point. For example, $C_{11}$ indicates the displacement vector in the first segment, and the arrow inclined in an upper right direction represents a vector leading the coordinate point obtained as a peak value up to the central original point. As will be clear from the illustration, it is possible to obtain a displacement vector for each segment, and also can be known therefrom the particular direction in which a displacement of the image has taken place for each segment.

FIG. 10 shows the relationship between the memory 31 and the memory 33. The memory 31 stores the displacement vector for each segment. A distorted coordinate is obtained from this displacement vector. The computation of the distorted coordinate from said displacement vector is achieved by interpolation. The memory 33 stores the distorted coordinate thus computed. The distorted coordinate of FIG. 10 shows only a typical diagram, but in practice the diagram is composed for each pixel by the interpolation computing unit 32, and it thus comprised of much denser coordinate axis.

Description will here return to that of FIG. 8. The partial displacement correcting unit 3 is comprised of a coordinate transforming unit 34 and a memory 35. This coordinate transforming unit 34 corrects the distortions of the image B of the memory 107 by the displacement vector for each pixel of the memory 33. This correction of distortion represents the correction of the distortion of the image B to that of the other image A. Whereby, the distortions of the image A and the image B are rendered to agree with each other. The data of the corrected image B is stored in the memory 35.

The subtraction computing unit 4 takes the subtraction between the images stored in the memory 35 and the memory 105. The result of this subtraction represents that there is no longer any disparity present between the image A and the image B with respect to image distortions. Whereby, the result of subtraction will provide a distortion-free functional image.

The above-described embodiment is suitable for use in the field of digital radiography, expecially in the instance wherein a subtraction between two images is taken to obtain a functional image. However, this invention is applicable also to other technical fields than the medical field.

The inter-image computation includes such techniques as the computation to take a subtraction between two images, the computation to take product of two images, the computation to take a ratio (division) between two images, and also the computation to take a sum of two images. The present invention has been described above with respect to only the computation to take the subtraction between two images. It should be noted, however, that the present invention can be applied equally effectively to all of the above-mentioned types of computation. Such a variation in type may be achieved by substituting the subtracting computation unit 4 in, for example, FIG. 8 by another suitable computation unit. Furthermore, the inter-image computation may be utilized not only in the medical electronics field, but also in the robot controlling field and in the pattern recognizing field.

What is claimed is:

1. An apparatus for correcting image distortions automatically by inter-image processing, comprising:
    a first memory for storing a first image;
    a second memory for storing a second image;
    a first processing means for segmenting the image stored in said first memory to first segmental images of a predetermined size where each of said first segmental images has a central region and peripheral regions surrounding the central region;
    a first multiplication means for multiplying each of said first segmental images by a first segmentation window function, said function emphasizing the central region and de-emphasizing the peripheral region of each semental image and thus lessen the adverse effects fue to discontinuities in the peripheral region;
    a second processing means for performing a Fourier transform for each multiplication performed by said first multiplication means;
    a third processing means for performing a spatial filtration for each Fourier transform performed by said second processing means, said spatial filtration for lessening the effect of the segmentation window function;
    a fourth processing means for segmenting the image stored in said second memory to second segmental images of a size same as that of said segmental images produced by said first processing means where each of said second segmental images has a central region and a peripheral region surrounding the central region;
    a second multiplication means for multiplying each of said second segmental images produced by said fourth processing means by a second segmentation window function, said second function operating on said second segmental images in the same way as the first function operates on the first segmental images;
    a fifth processing means for performing a Fourier transform for each multiplication performed by the second multiplication means;
    a sixth processing means for performing a spatial filtration for each Fourier transformation performed by the fifth processing means, said last-mentioned spatial filtration lessening the effect of said second segmentation window function;
    a seventh processing means for performing a cross correlation computation, on a complex plane, between mutually corresponding outputs of said third and sixth processing means;
    an eighth processing means for performing an inverse Fourier transform for each cross correlation computation performed by said seventh processing means; and
    a ninth processing means for computing an amount of mutual displacement between the first and second segmental images based on said cross correlation computations.

2. Apparatus as in claim 1 where said third processing means includes a third multiplying means for multiplying each Fourier transform output of the second processing means with a filter function which effects said spatial filtration and a first memory for storing each of the aforesaid multiplications.

3. Apparatus as in claim 2 where said sixth processing means includes a fourth multiplying means for multiplying each Fourier transform output of the fifth processing means with said filter function which effects said spatial filtration and a second memory for storing each of the aforesaid multiplications.

4. Apparatus as in claim 1 where said seventh processing means includes means for providing a complex conjugate of each spatial filtration performed by the third processing means and fifth multiplying means for multiplying each said complex conjugate and each spatial filtration performed by the sixth processing means to thus effect said cross correlation computation.

5. Apparatus as in claim 1 where said ninth processing means includes peak detecting means for detecting the maximum cross correlation value obtained for each third segmental image which results from the cross correlation of the first and second segmental images and means responsive to the location of said maximum correlation values respectively within said third segmental values for determining said mutual displacement between the first and second segmental images.

6. Apparatus as in claim 1 including tenth processing means responsive to the values of said mutual displacement for correcting distortions in the second image.

7. Apparatus as in claim 6 for subtracting the corrected second image from the first image to thus remove any disparity between these images with respect to image distortions.

8. Apparatus as in claim 1 including means for obtaining said first and second images by subjecting at least a portion of a body to ragiographic exposure at successive instances of time.

9. Apparatus as in claim 8 where said object is moving during said radiographic exposure.

* * * * *